United States Patent
Kao et al.

(10) Patent No.: US 7,447,357 B2
(45) Date of Patent: Nov. 4, 2008

(54) APPARATUS AND METHOD FOR ADJUSTING INPUTTED IMAGE ON THE BASIS OF CHARACTERISTICS OF DISPLAY SYSTEM

(75) Inventors: Hsu-Pin Kao, Pingjen (TW); Yi-Sheng Yu, Taoyuan (TW); Yung-Sheng Hsu, Kaohsiung (TW); Yi-Chia Shan, Chungli (TW)

(73) Assignee: Quanta Computer Inc., Tao Yuan Shien (TW)

( * ) Notice: Subject to any disclaimer, the term of this patent is extended or adjusted under 35 U.S.C. 154(b) by 655 days.

(21) Appl. No.: 11/199,953

(22) Filed: Aug. 8, 2005

(65) Prior Publication Data

US 2006/0197987 A1 Sep. 7, 2006

(30) Foreign Application Priority Data

Mar. 2, 2005 (TW) ............................... 94106351 A

(51) Int. Cl.
*G06K 9/00* (2006.01)
*G03F 3/08* (2006.01)
*G06K 9/36* (2006.01)

(52) U.S. Cl. ........................................ 382/167; 358/518

(58) Field of Classification Search ................ 382/162, 382/164, 165, 167, 173, 254, 284; 358/1.1, 358/1.9, 515, 518, 523, 525, 530; 345/589, 345/600–604

See application file for complete search history.

(56) References Cited

U.S. PATENT DOCUMENTS

| | | | | |
|---|---|---|---|---|
| 5,121,195 A * | 6/1992 | Seki et al. | .................. | 358/515 |
| 5,289,295 A * | 2/1994 | Yumiba et al. | .............. | 358/518 |
| 5,742,410 A * | 4/1998 | Suzuki | ....................... | 358/518 |
| 5,915,075 A * | 6/1999 | Kadowaki | ................... | 358/1.9 |
| 6,157,734 A * | 12/2000 | Iida | ............................ | 382/162 |
| 6,320,668 B1 * | 11/2001 | Kim | ........................... | 358/1.1 |
| 6,320,980 B1 * | 11/2001 | Hidaka | ...................... | 382/167 |
| 6,751,349 B2 * | 6/2004 | Matama | ...................... | 382/167 |
| 7,103,216 B2 * | 9/2006 | Okamoto | .................... | 382/167 |
| 7,177,469 B2 * | 2/2007 | Kagawa et al. | .............. | 382/167 |
| 7,239,744 B2 * | 7/2007 | Arazaki | ...................... | 382/167 |
| 7,251,360 B2 * | 7/2007 | Takahashi | ................... | 382/167 |
| 7,271,812 B2 * | 9/2007 | Van Dyke et al. | ........... | 345/603 |

* cited by examiner

*Primary Examiner*—Amir Alavi
(74) *Attorney, Agent, or Firm*—Reed Smith LLP; Stanley P. Fisher, Esq.; Juan Carlos A. Marquez, Esq.

(57) ABSTRACT

A method for adjusting an input image on the basis of the characteristics of a display system is provided. The input image includes N color elements and the display system is capable of displaying P second gray levels. P sets of first conversion coefficients related to the characteristics of the display system are beforehand stored in a look-up table. The method according to this invention first calculates an estimated gray level according to the input image and a set of predetermined second conversion coefficients. Then, a set of third conversion coefficients corresponding to the estimated gray level is selected from the look-up table. A final gray level is calculated on the basis of the set of third conversion coefficients. Finally, the final gray level and the N color components are combined into an adjusted image to replace the input image, whereby the input image is adjusted.

10 Claims, 3 Drawing Sheets

FIG.1 (Prior Arts)

APPARATUS AND METHOD FOR ADJUSTING INPUTTED IMAGE ON THE BASIS OF CHARACTERISTICS OF DISPLAY SYSTEM

BACKGROUND OF THE INVENTION

1. Field of the Invention

This invention relates to a method and an apparatus for processing images. More specifically, this invention relates to a method and an apparatus for adjusting an image on the basis of the characteristics of a display system.

2. Description of the Prior Art

Generally, the brightness and the color coordinates of the three colors, red, green, and blue, in a display system are characteristics of the display system itself; thus, those characteristics may not be exactly the same as those specified in some video specifications, for example, NTSC, EBU, etc. Therefore, an image usually has to be properly adjusted before being displayed on a display system such that the color and the brightness of the image will be displayed correctly.

As known to the people skilled in this art, the color coordinates of the three colors in a display system are different from those in some video specifications. The colors specified in the specifications can be generated by properly combining the colors of the display system on the basis of the laws of color matching. According to the laws of color matching, the relationship between colors and brightness in the display system (hereinafter as Red, Green, and Blue) and the specification (hereinafter as $Red_{SPEC}$, $Green_{SPEC}$, $Blue_{SPEC}$) can be represented as:

$$Red_{SPEC} = k_1[a_{11}Red + a_{12}Green + a_{13}Blue] \quad \text{(Equation 1)}$$

$$Green_{SPEC} = k_2[a_{21}Red + a_{22}Green + a_{23}Blue] \quad \text{(Equation 2)}$$

$$Blue_{SPEC} = k_3[a_{31}Red + a_{32}Green + a_{33}Blue] \quad \text{(Equation 3)}$$

$a_{11}$, $a_{12}$, $a_{13}$, $a_{21}$, $a_{22}$, $a_{23}$, $a_{31}$, $a_{32}$, and $a_{33}$ in the above equations are called conversion coefficients of color spaces and are generated on the basis of the laws of color matching, the color coordinates and the brightness of the display system, and the color coordinates defined in the specification. $k_1$, $k_2$, $k_3$ in the above equations are coefficients of brightness ratio.

In the prior arts, the color coordinates of a display system are assumed to be constants. However, the color coordinates would change with different gray levels. Please refer to FIG. 1. FIG. 1 shows the relationship between the red color coordinates and the gray levels in a plasma display panel. As shown in FIG. 1, the color coordinates change with gray levels.

If a display system always adopts color coordinates corresponding to a high gray level to adjust the input images, the input image with low gray levels can never be displayed correctly. On the contrary, if a display system always adopts color coordinates corresponding to a low gray level to adjust the input images, the input image with high gray levels can never be displayed correctly.

Accordingly, one main purpose of this invention is to provide a method and an apparatus for adjusting an input image on the basis of the characteristics of a display system. Compared with the prior arts, the method and the apparatus according to this invention adjust the gray levels of an input image on the basis of the specification and the characteristics of the display system. That is to say, the method and the apparatus according to this invention can assist display systems to select proper gray levels for an input image such that the input image can be displayed correctly without color inaccuracy.

SUMMARY OF THE INVENTION

This invention provides a method and an apparatus for adjusting an input image on the basis of the characteristics of a display system. In this invention, the variations of color coordinates are also considered when the input image is adjusted.

The input image, meeting a specification, includes N color components, wherein each of the N color components has its respective first color coordinates $(X1_i, Y1_i)$, where N is a natural number, and i is an integer index ranging from 1 to N. The input image also includes N first gray levels ($G1_i$, i=1~N), and each of the N first gray levels corresponds to one of the N color components.

The display system is capable of displaying P second gray levels, where P is a natural number. P sets of second color coordinates corresponding to the P second gray levels are predetermined. The P sets of second color coordinates are related to the characteristics of the display system. P sets of first conversion coefficients ($a_{ij}$, i=1~N, j=1~N) are calculated beforehand according to a rule of color matching, the first color coordinates, and the P sets of second color coordinates. A look-up table is used for storing the P sets of first conversion coefficients. For the ith color component among the N color components, a initial second gray level, $G_{PREi}$, and a set of second conversion coefficients ($a_{PREij}$, j=1~N) corresponding to $G_{PREi}$ are predetermined.

The method according to one preferred embodiment of this invention first calculates N adjusted gray levels ($G2_i$, i=1~N) on the basis of said specification and the N first gray levels, where each of the N adjusted gray levels corresponds to one of the N color components. The method then calculates N estimated gray levels ($G_{ESTj}$, j=1~N) according to a first set of equations, the N adjusted gray levels, and the sets of second conversion coefficients ($a_{PREij}$, i=1~N, j=1~N). Based on the N estimated gray levels, a set of third conversion coefficients ($b_{ij}$, i=1~N, j=1~N) corresponding to the N estimated gray levels is selected from the look-up table. The method then calculates N final gray levels ($G_{FINALj}$, j=1~N) according to a second set of equations, the N adjusted gray levels, and the set of third conversion coefficients. At last, the method combines the N final gray levels and the N color components into an adjusted image to replace the input image, whereby the input image is adjusted.

The apparatus according to one preferred embodiment of this invention includes: a look-up table, a processing module, a first converting circuit, a selecting module, a second converting circuit, and a combining module.

The look-up table is used for storing P second gray levels and P sets of first conversion coefficients. The processing module is used for calculating N adjusted gray levels ($G2_i$, i=1~N) on the basis of said specification and the N first gray levels, where each of the N adjusted gray level corresponds to one of the N color components. The first converting circuit calculates N estimated gray levels ($G_{ESTj}$, j=1~N) according to a first equation, the N adjusted gray levels, and the sets of second conversion coefficients ($a_{PREij}$, i=1~N, j=1~N). The selecting module selects a set of third conversion coefficients ($b_{ij}$, i=1~N, j=1~N) corresponding to the N estimated gray levels from the look-up table. The second converting circuit is used for calculating N final gray levels ($G_{FINALj}$, j=1~N) according to a second equation, the N adjusted gray levels, and the set of third conversion coefficients. The combining module is used for combining the N final gray levels and the N color components into an adjusted image to replace the input image, whereby the input image is adjusted.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides a method and an apparatus for adjusting an input image based on the characteristics of a display system. The input image includes N color components. For example, if the input image includes the three colors, red, green, and blue, then N is equal to 3. Each of the N color components in the input image has respective first color coordinates $(X1_i, Y1_i)$ in accordance with a specification, where N is a natural number and i is an integer index ranging from 1 to N. The specification can be NTSC or EBU. The input image also includes N first gray levels ($G1_i$, i=1~N), and each of the N first gray levels corresponds to one of the N color components.

In actual applications, the N first gray levels are converted by Gamma correction such that each first gray level has a respective linear correlation with the brightness of its corresponding color component.

In some display systems, besides aforementioned Gamma correction, the input signals might be amplified to provide more gray level details. For instance, an 8-bit image may be amplified into a 12-bit image after Gamma correction.

The display system is capable of displaying the N color components and P second gray levels, where P is a natural number. For example, if a display system is capable of displaying 256 different gray levels, then P is equal to 256. P sets of second color coordinates corresponding to the P second gray levels are predetermined. The P sets of second color coordinates are related to the characteristics of the display system. If the display system is ideal, the P sets of second color coordinates would be the same, that is to say, the second color coordinates do not vary with different second gray levels. However, in most display systems, the second color coordinates are not constants.

In this invention, P sets of first conversion coefficients ($a_{ij}$, i=1~N, j=1~N) are previously calculated according to a rule of color matching, the first color coordinates, and the P sets of second color coordinates. A look-up table is used for storing the P sets of first conversion coefficients. The rule of color matching can be Grassman's Laws of Color Matching.

Furthermore, for the ith color component among the N color components, a respective initial second gray level, $G_{PREi}$, and a respective set of second conversion coefficients ($a_{PREij}$, j=1~N) corresponding to $G_{PREi}$ are predetermined.

Figure 1:
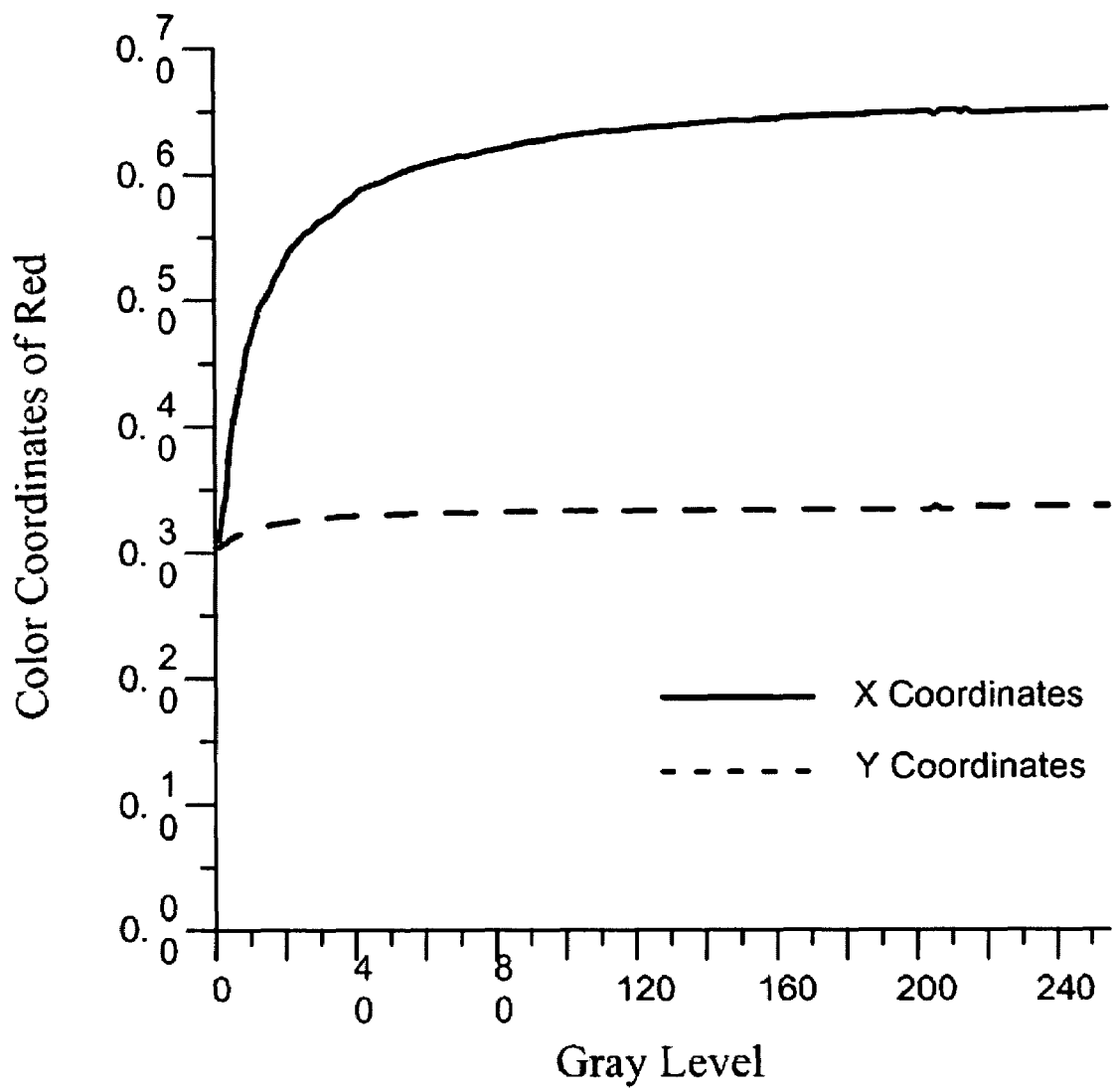
FIG. 1 shows the relationship between the red color coordinates and the gray level in a plasma display panel.
Figure 2:
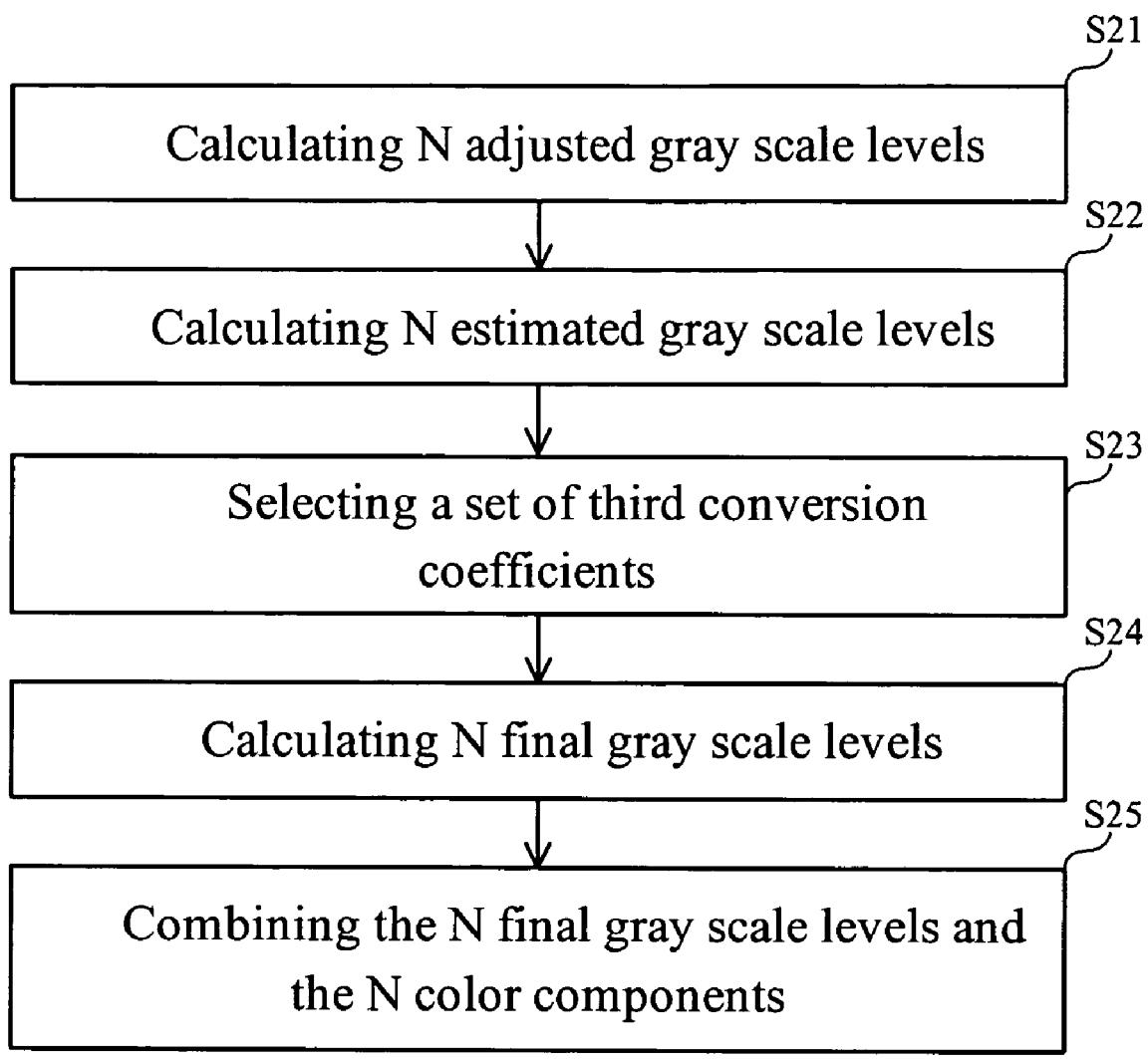
FIG. 2 shows the flow chart of the method of one preferred embodiment according to this invention.

Please refer to FIG. 2. FIG. 2 shows the flow chart of the method of one preferred embodiment according to this invention. Step S21 is first performed to calculate N adjusted gray levels ($G2_i$, i=1~N) on the basis of said specification and the N first gray levels. Each of the N adjusted gray level corresponds to one of the N color components. Step S22 calculates N estimated gray levels ($G_{ESTj}$, j=1~N) according to a first equation, the N adjusted gray levels, and the sets of second conversion coefficients ($a_{PREij}$, i=1~N, j=1~N). In step S23, based on the N estimated gray levels, a set of third conversion coefficients ($b_{ij}$, i=1~N, j=1~N) corresponding to the N estimated gray levels is selected from the look-up table. Step S24 calculates N final gray levels ($G_{FINALj}$, j=1~N) according to a second equation, the N adjusted gray levels, and the set of third conversion coefficients. And in step S25 the N final gray levels and the N color components are combined into an adjusted image to replace the input image, whereby the input image is adjusted.

In this preferred embodiment, the first equation is $G_{ESTj} = \Sum_{i=1}^{N} G2_i a_{PREij}$ and the second equation is $G_{FINALj} = \Sum_{i=1}^{N} G2_i b_{ij}$. The first equation and the second equation are derived on the basis of the aforementioned rule of color matching.

In some display systems, if the input image has been amplified in Gamma correction, the adjusted image must be processed by error diffusion method after being adjusted by this method. Similarly, if the input image has been processed by Gamma conversion, the adjusted image must be converted by Gamma correction again after being adjusted by this method, so that the brightness of the adjusted image is correct.

Figure 3:
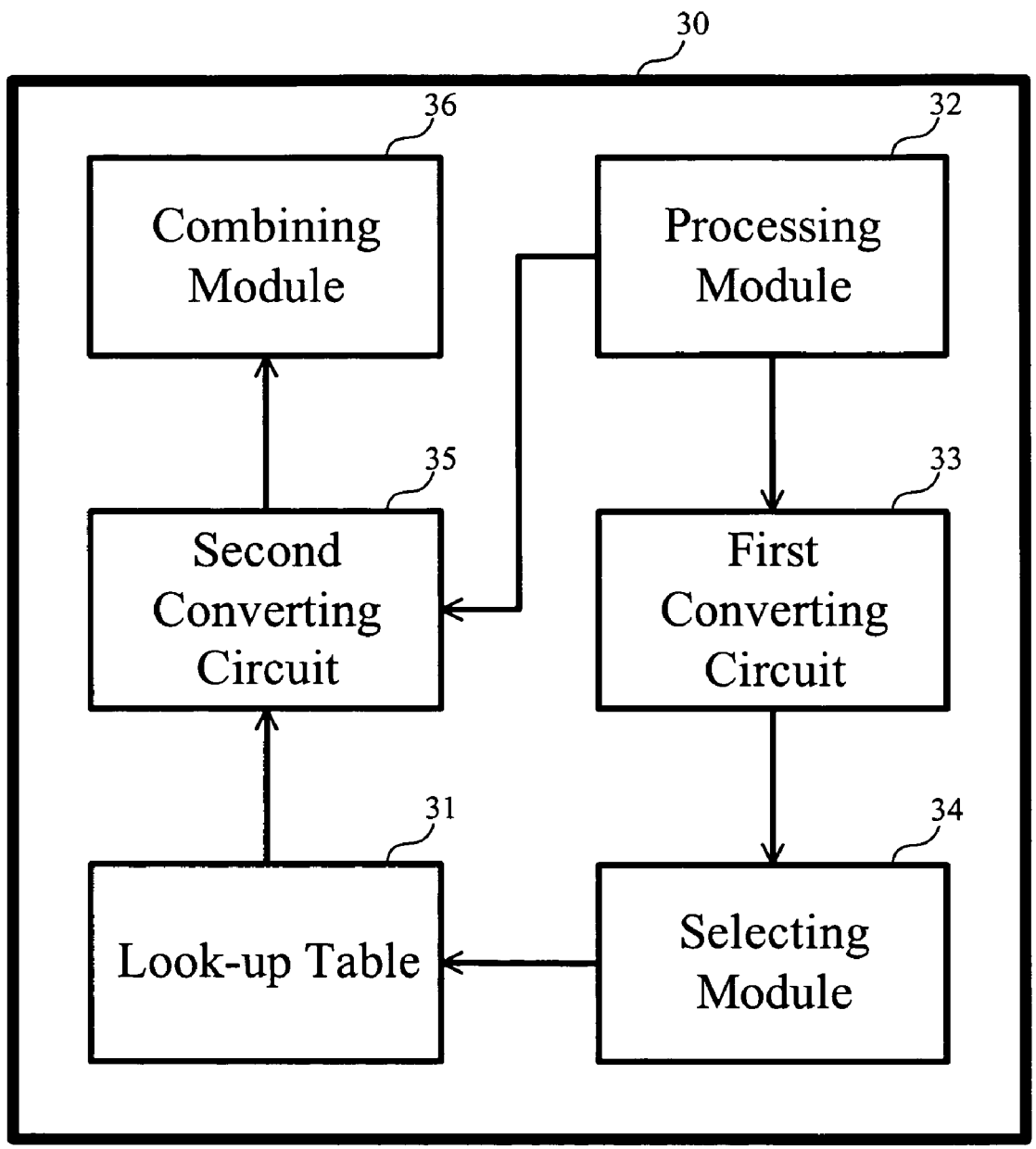
FIG. 3 shows the block diagram of the apparatus of one preferred embodiment according to this invention.

Please refer to FIG. 3. FIG. 3 shows the block diagram of an adjusting apparatus of one preferred embodiment according to this invention. The adjusting apparatus includes a look-up table 31, a processing module 32, a first converting circuit 33, a selecting module 34, a second converting circuit 35, and a combining module 36.

The look-up table 31 is used for storing the P sets of first conversion coefficients. The processing module 32 is used for calculating N adjusted gray levels ($G2_i$, i=1~N) on the basis of said specification and the N first gray levels. Each of the N adjusted gray level corresponds to one of the N color components. The first converting circuit 33 calculates N estimated gray levels ($G_{ESTj}$, j=1~N) according to a first equation, the N adjusted gray levels, and the sets of second conversion coefficients ($a_{PREij}$, i=1~N, j=1~N). The selecting module 34 selects a set of third conversion coefficients ($b_{ij}$, i=1~N, j=1~N) corresponding to the N estimated gray levels from the look-up table 31. The second converting circuit 35 is used for calculating N final gray levels ($G_{FINALj}$, j=1~N) according to a second equation, the N adjusted gray levels, and the set of third conversion coefficients. The combining module 36 is used for combining the N final gray levels and the N color components into an adjusted image to replace the input image, whereby the input image is adjusted.

Compared with the prior arts, the method and the apparatus according to this invention adjust the gray levels of the input image on the basis of the specification met by the input image and the characteristics of the display system. That is to say, the method and the apparatus according to this invention can assist display systems to select a proper gray level for an input image such that the input image can be displayed correctly without color inaccuracy.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting an input image on the basis of the characteristics of a display system, the input image comprising N color components, each of the N color components having respective first color coordinates $(X1_i, Y1_i)$ in accordance with a specification, N being an natural number, i being an integer index ranging from 1 to N, the input image also comprising N first gray levels ($G1_i$, i=1~N), each of the N first gray levels corresponding to one of the N color components, the display system being capable of displaying P second gray levels, P being a natural number, P sets of second color coordinates corresponding to the P second gray levels being predetermined, the P sets of the second color coordinates being related to the characteristics of the display system, P sets of first conversion coefficients ($a_{ij}$, i=1~N, j=1~N) being previously calculated according to a rule of color matching, the first color coordinates, and the P sets of second color coordinates, a look-up table being used for storing the P sets of first conversion coefficients, for the ith color component among the N color components, a respective initial second gray level, $G_{PREi}$, and a respective set of second conversion coefficients ($a_{PREij}$, j=1~N) corresponding to $G_{PREi}$ being predetermined, said method comprising the steps of:

based on said specification and the N first gray levels, calculating N adjusted gray levels ($G2_i$, i=1~N), wherein each of the N adjusted gray level corresponds to one of the N color components;

according to a first equation, the N adjusted gray levels, and the sets of second conversion coefficients ($a_{PREij}$, i=1~N, j=1~N), calculating N estimated gray levels ($G_{ESTj}$, j=1~N);

based on the N estimated gray levels, selecting a set of third conversion coefficients ($b_{ij}$, i=1~N, j=1~N) corresponding to the N estimated gray levels from the look-up table;

according to a second equation, the N adjusted gray levels, and the set of third conversion coefficients, calculating N final gray levels ($G_{FINALj}$, j=1~N); and combining the N final gray levels and the N color components into an adjusted image to replace the input image, whereby the inputted image is adjusted.

2. The method of claim 1, wherein said specification is NTSC or EBU.

3. The method of claim 1, wherein said rule of color matching is Grassman's Laws of Color Matching.

4. The method of claim 1, wherein said first equation is:

$$G_{ESTj}=\Sigma_{i=1}^{N}G2_i a_{PREij}.$$

5. The method of claim 1, wherein said second equation is:

$$G_{FINALj}=\Sigma_{i=1}^{N}G2_i b_{ij}.$$

6. An apparatus for adjusting an inputted image on the basis of the characteristics of a display system, the input image comprising N color components, each of the N color components having respective first color coordinates ($X1_i,Y1_i$) in accordance with a specification, N being an natural number, i being an integer index ranging from 1 to N, the input image also comprising N first gray levels ($G1_i$, i=1~N), each of the N first gray levels corresponding to one of the N color components, the display system being capable of displaying P second gray levels, P being a natural number, P sets of second color coordinates corresponding to the P second gray levels being predetermined, the P sets of the second color coordinates being related to the characteristics of the display system, P sets of first conversion coefficients ($a_{ij}$, i=1~N, j=1~N) being previously calculated according to a rule of color matching, the first color coordinates, and the P sets of second color coordinates, for the ith color component among the N color components, a respective initial second gray level, $G_{PREi}$, and a respective set of second conversion coefficients ($a_{PREij}$, j=1~N) corresponding to $G_{PREi}$ being predetermined, said apparatus comprising:

a look-up table for storing the P sets of first conversion coefficients;

a processing module for calculating N adjusted gray levels ($G2_i$, i=1~N) on the basis of said specification and the N first gray levels, wherein each of the N adjusted gray level corresponds to one of the N color components;

a first converting circuit for calculating N estimated gray levels ($G_{ESTj}$, j=1~N) according to a first equation, the N adjusted gray levels, and the sets of second conversion coefficients ($a_{PREij}$, i=1~N, j=1~N);

a selecting module for selecting a set of third conversion coefficients ($b_{ij}$, i=1~N, j=1~N) corresponding to the N estimated gray levels from the look-up table on the basis of the N estimated gray levels;

a second converting circuit for calculating N final gray levels ($G_{FINALj}$, j=1~N) according to a second equation, the N adjusted gray levels, and the set of third conversion coefficients; and a combining module for combining the N final gray levels and the N color components into an adjusted image to replace the input image, whereby the input image is adjusted.

7. The apparatus of claim 6, wherein said specification is NTSC or EBU.

8. The apparatus of claim 6, wherein said rule of color matching is Grassman's Laws of Color Matching.

9. The apparatus of claim 6, wherein said first equation is:

$$G_{ESTj}=\Sigma_{i=1}^{N}G2_i a_{PREij}.$$

10. The apparatus of claim 6, wherein said second equation is:

$$G_{FINALj}=\Sigma_{i=1}^{N}G2_i b_{ij}.$$

* * * * *